United States Patent [19]

Shekleton

[11] Patent Number: 5,085,039
[45] Date of Patent: Feb. 4, 1992

[54] COANDA PHENOMENA COMBUSTOR FOR A TURBINE ENGINE

[75] Inventor: Jack R. Shekleton, San Diego, Calif.

[73] Assignee: Sundstrand Corporation, Rockford, Ill.

[21] Appl. No.: 447,445

[22] Filed: Dec. 7, 1989

[51] Int. Cl.⁵ .................................................. F02C 3/05
[52] U.S. Cl. ...................................... 60/39.36; 60/760
[58] Field of Search ............... 60/39.36, 760, 29.83, 60/722, 39.142

[56] References Cited

U.S. PATENT DOCUMENTS

| | | |
|---|---|---|
| 3,055,179 | 9/1962 | Lefebvre et al. . |
| 3,099,134 | 7/1963 | Calder et al. . |
| 3,390,521 | 7/1968 | Anley et al. ............ 60/39.142 |
| 3,512,359 | 5/1970 | Pierce . |
| 3,645,095 | 2/1972 | Melconian . |
| 3,691,766 | 9/1972 | Champion . |
| 3,968,644 | 7/1976 | Fehler . |
| 4,073,137 | 2/1978 | Roberts . |
| 4,151,709 | 5/1979 | Melionian et al. ............ 60/39.36 |
| 4,237,694 | 12/1980 | Wood et al. . |
| 4,718,238 | 1/1988 | Todd et al. . |
| 4,955,192 | 9/1990 | Shekleton ...................... 60/39.83 |

Primary Examiner—Louis J. Casaregola
Assistant Examiner—Timothy S. Thorpe
Attorney, Agent, or Firm—Wood, Phillips, Mason, Recktenwald & VanSanten

[57] ABSTRACT

The expense of a cover (80) for non-uniform structure (38) on or adjacent a surface (90) of a rear turbine shroud 34 facing a cooling passage defined by the rear engine shroud (34) and a wall (62) of a combustor (50) in a gas turbine engine can be avoided by providing a connecting wall (100) that is smoothly curved between the radially inner wall (58) and a conical wall (62) of the combustor (50). The resulting cooling air stream will attach itself to the walls (100) and (62) by reason of the Coanda effect, rendering the presence of non-uniform structure (38) on the surface (90) unimportant.

78 Claims, 2 Drawing Sheets

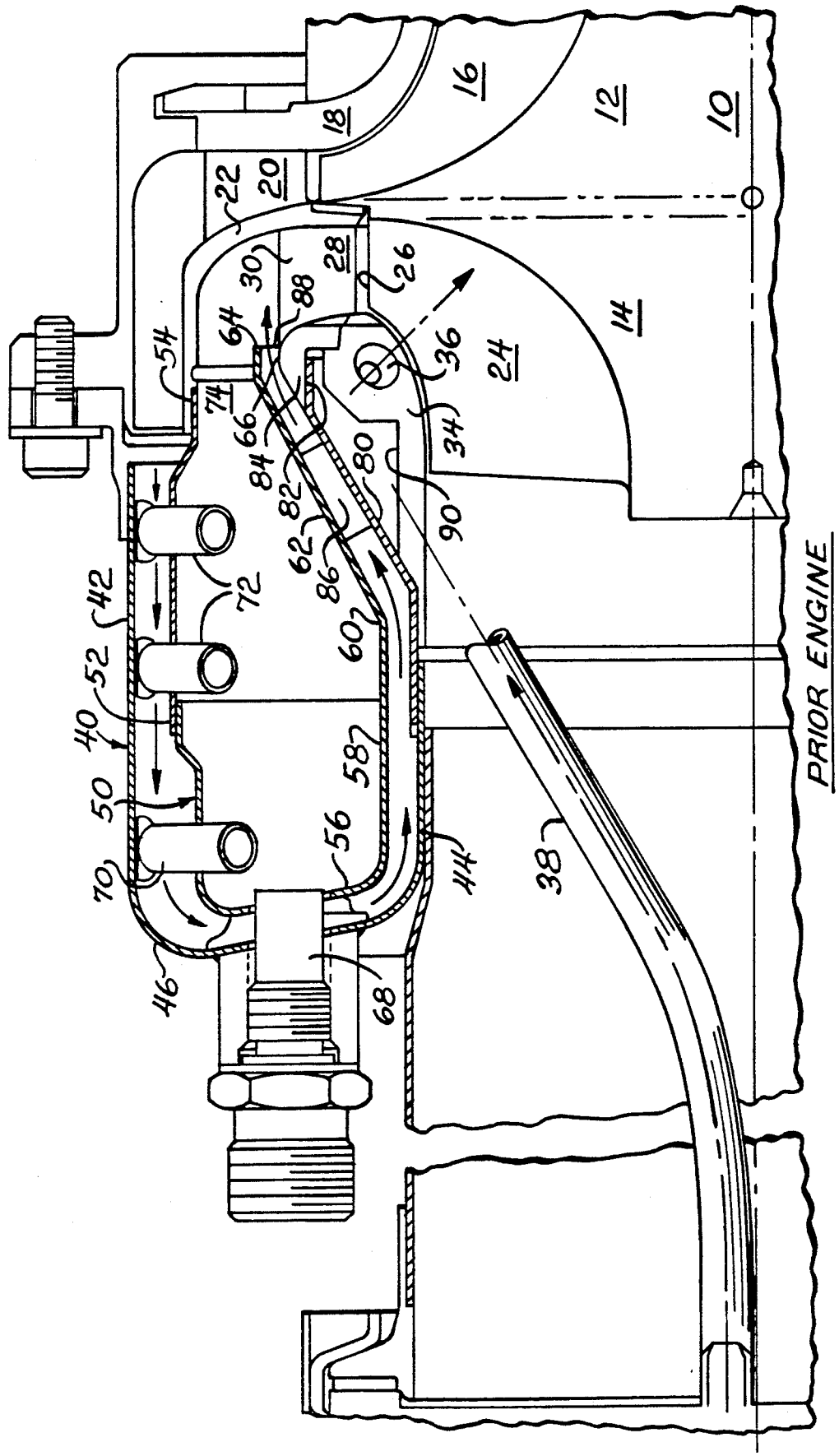
FIG. 1 PRIOR ENGINE

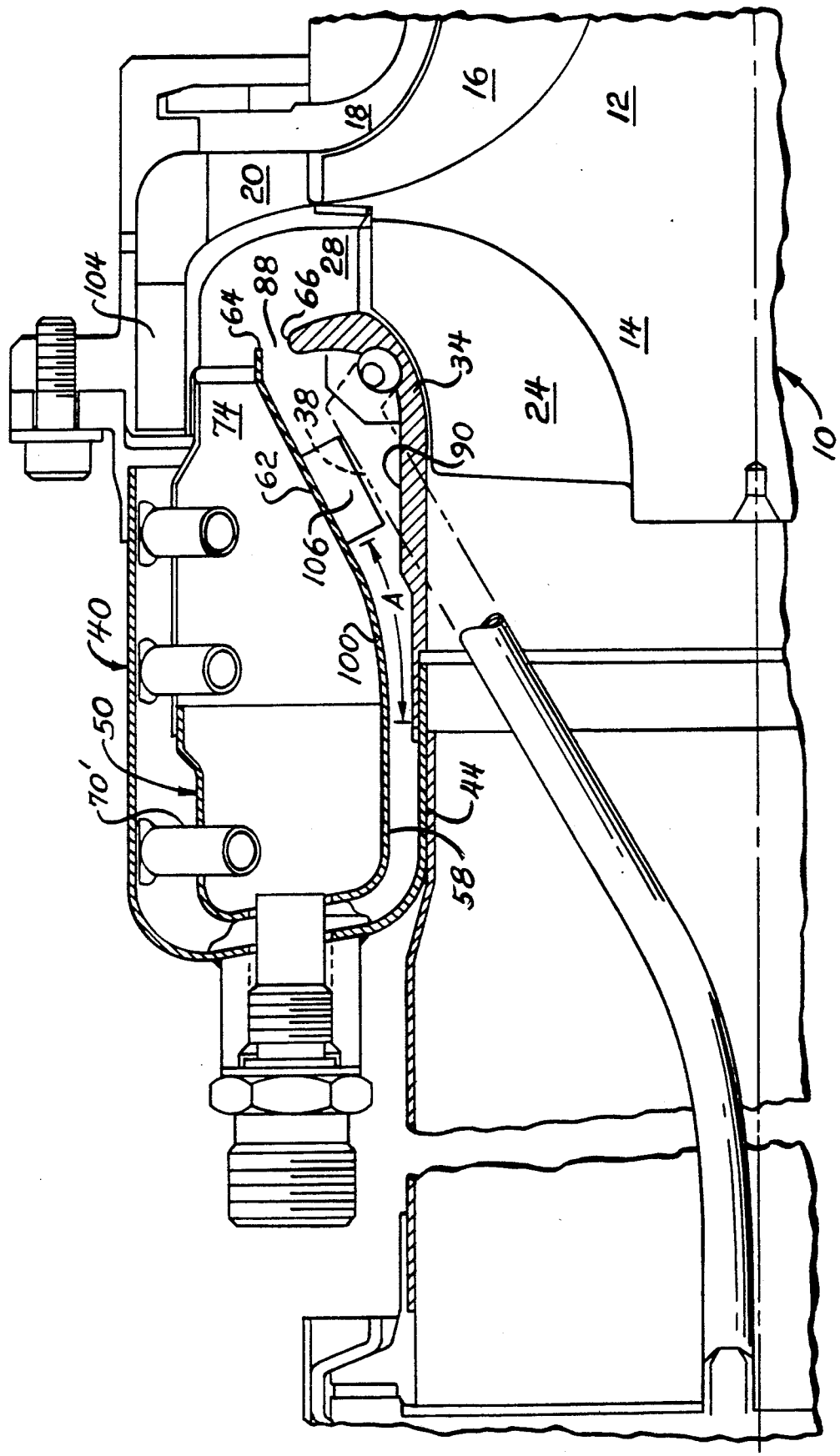

COANDA PHENOMENA COMBUSTOR FOR A TURBINE ENGINE

FIELD OF THE INVENTION

This invention relates to gas turbine engines, and more particularly, to an improved combustor configuration therefor.

BACKGROUND OF THE INVENTINO

Various proposals have been made for circulating cooling air from the compressor of a gas turbine engine substantially entirely about an annular combustor associated with a radial turbine wheel. In the usual case, the cooling air stream is confined against the combustor by a plenum such that it flows first about the radially outer wall of the combustor, then about a generally radial wall of the combustor oppositely from the combustor outlet, and then about a radially inner wall to ultimately impinge against the rear turbine shroud and be directed somewhat radially outwardly to discharge at the turbine nozzle through a space between an edge of the combustor and an edge of the rear turbine shroud.

While this approach works well, in some instances, certain difficulties present themselves. For example, it is not unusual to start gas turbines by rapidly accelerating the turbine wheel with a stream of hot gas derived from a pyrotechnic source, frequently referred to as a start cartridge. While the means by which such hot gas is directed against the turbine wheel take on a number of forms, it is not uncommon to provide one or more apertures in the rear turbine shroud along with associated piping on the side of the rear turbine shroud opposite from the turbine wheel to the start cartridge.

Such piping is, of course, located in the path of cooling air flowing about the combustor and is a non-unif ,orm structure in such space, providing non-uniform resistance to the flow of cooling air. Non-uniform resistance results in non-uniform cooling air flow which in turn results in nonuniform cooling. Non-uniform cooling results in the generation of thermal stresses during operation of the turbine and that in turn will ultimately reduce the life of the engine.

To avoid this problem, it has been customary to cover the piping or the hot gas starter nozzle with an aerodynamically uniform cover. The cover of course adds to the cost as well as the complexity of the engine.

The present invention is directed to overcoming the above problem.

SUMMARY OF THE INVENTION

It is the principal object of the invention to provide a new and improved turbine engine. More particularly, it is an object of the invention to provide a turbine engine that may be fabricated inexpensively and without the need for an aerodynamically smooth cover for non-uniform structure that might be present on the surface of the rear turbine shroud confronting the cooling air passage.

An exemplary embodiment of the invention achieves the foregoing objects in a gas turbine engine including a rotary compressor, a radial flow turbine wheel coupled to the compressor, an annular combustor having a radially inner wall and a conical wall extending axially toward the turbine wheel and radially outwardly from the inner wall and further being connected thereto and terminating in an outlet, a nozzle surrounding the turbine wheel and connected to the outlet, and a compressed air plenum connected to the compressor and generally surrounding the combustor and terminating in a rear turbine shroud adjacent the turbine wheel and spaced from the conical wall to define a cooling air passage between the inner wall and the conical wall on the one hand and the plenum and the rear turbine shroud on the other. The invention contemplates the improvement wherein the engine is characterized by the presence of an interconnecting wall of smoothly curved cross section joining the inner wall and the conical wall so as to cause a cooling air stream in the passage to attach itself to the interconnecting and conical walls.

Because of such attachment to the combustor wall, the configuration of the facing surface of the rear turbine shroud becomes immaterial as it is not contacted by the cooling air stream.

In a preferred embodiment, the surface of the rear turbine shroud is exposed to the cooling air passage and, in the geometric sense, is not similar to the conical wall.

A highly preferred embodiment of the invention contemplates that the engine will further be characterized by the absence of any aerodynamically uniform cover for the rear shroud and the non-uniform structure that may be thereon.

In a highly preferred embodiment of the invention, the non-uniform structure comprises at least one hot gas starter tube.

In a preferred embodiment, the rear turbine shroud and the conical wall have spaced edges adjacent the nozzle and the cross sectional area of the space between the edges is no greater than the cross sectional area of the cooling air passage along the interconnecting and conical walls.

The invention also contemplates that the interconnecting and conical walls are dimensioned so as to create no greater restriction to the flow of cooling air through the air cooling passage than exists at the space between the edges to assure that the cooling air stream will remain attached to the combustor wall.

In a highly preferred embodiment, the invention contemplates the provision of means for inducing swirl in the cooling air stream so that centrifugal force acting on the swirling air further assists in attaching the cooling air stream to the combustor wall.

Other objects and advantages will become apparent from the following specification taken in connection with the accompanying drawings.

DESCRIPTION OF THE DRAWINGS

FIG. 1 is a sectional view of a prior form of gas turbine engine not employing the invention; and FIG. 2 is a view similar to FIG. 1 but illustrating a gas turbine engine made according to the invention.

DESCRIPTION OF THE PRIOR TURBINE ENGINE

With reference to FIG. 1, a gas turbine engine made prior in time to that of the present invention is illustrated and is seen to include a rotor hub 10 made up of a rotary compressor 12 and a turbine wheel 14 coupled thereto. The compressor 12 includes compressor blades 16 which operate in connection with a compressor shroud 18 to direct compressed air to diffuser vanes 20 of a conventional design which extend between the compressor shroud 18 and a front turbine shroud 22.

The turbine wheel 14 include blades 24 having radially outer tips 26 in adjacency to an annular nozzle 28. The turbine wheel 14 thus is a radial turbine wheel and the nozzle 28 includes plural vanes 30 that extend between the front turbine shroud 22 and a rear turbine shroud 34. The rear turbine shroud 34 includes one or more starting openings or nozzles 36 which are connected to respective hot gas starter tubes 38. The hot gas starter tube 38 is coupled to a start cartridge in any conventional fashion and, when the start cartridge is activated, the tube 38 conveys the resulting hot gases to the opening or nozzle 36 to direct the same against the blades 24 and accelerate the turbine wheel 4, thus driving the compressor 12.

The turbine engine also includes a plenum, generally designated 40, which is annular in configuration and includes a radially outer wall 42, a radially inner wall 44 and a connecting, radial wall 46. The plenum 40 surrounds an annular combustor, generally designated 50. The annular combustor 50 includes a radially outer wall 52 having an edge 54 connected to the front turbine shroud 22 and spaced inwardly from the plenum wall 44. Also included is a radial wall 56 and a radially inner wall 58. At a junction 60, the radially inner wall 58 connects to a conical wall 62 which extends toward the turbine wheel 14 in the axial direction and radially outwardly to terminate in an edge 64 which in turn is spaced from an edge 66 of a rear turbine shroud 34. One or more igniters 68 extend into the combustion chamber 50 to ignite fuel that may be injected therein through injectors 70. Additional tubes 72 in fluid communication with the space between the plenum 40 and the combustor 50 may inject dilution air into the combustor 50.

The edges 54 and 64 of the outer and inner walls, respectively, define an outlet in fluid communication with the nozzle 26. Consequently, gases of combustion resulting from the combustion of fuel within the combustor 50 exit through such outlet, which is given the reference numeral 74, to be directed by the nozzle 28 against the blades 24 to drive the turbine wheel 14, and thus the compressor 10.

The construction is completed by a cover 80 that extends from the plenum wall 44 to the underside 82 of a nose 84 adjacent the edge 66 of the rear turbine shroud 34. The purpose of this cover 80 is to cover the tube 38. To this end, the cover 80 is aerodynamically smooth to the extent that it is similar in the geometric sense in shape to the conical wall 62, paralleling the same in section. Swirler vanes 86 may also be incorporated.

As a result of the foregoing, it would be appreciated that a cooling air space extends completely about the combustor 50 as a result of the spacing of the walls of the plenum 40 therefrom. Such cooling air passes in the direction of the arrows illustrated and ultimately exits through a space 88 between the edge 64 of the conical wall 62 and the edge 66 of the rear turbine shroud 34 to pass along with the gases of combustion through the nozzle 28. The purpose of the cover 80 is to cover non-uniform structure, such as the tube 38, that may be on or adjacent the surface 90 of the rear turbine shroud 34 which faces the conical wall 62. As alluded to previously, non-uniformities in this area result in non-uniform air flow of the cooling air in the cooling passage about combustor 50 and the problems associated therewith.

DESCRIPTION OF THE PREFERRED EMBODIMENT

Referring to FIG. 2, the invention will now be described. In many respects, the turbine engine shown in FIG. 2 embodies structure identical to that already described in connection with the description of the prior engine in FIG. 1. In the interest of brevity, it will not be redescribed herein, it being understood that like elements bear like reference numbers.

As can be readily seen, the junction 60 between the radially inner wall 58 of the combustor 50 and the conical wall 62 has been eliminated in favor of an interconnecting section 100 having the arc length shown at "A" in FIG. 2. That is to say, the interconnecting wall 100 is one of generous radius and, in cross section, appears as a smooth curve linking the radially inner wall 58 and the conical wall 62. As a result of this configuration, the cooling air stream passing between the radially inner wall 58 of the combustor 40 and the radially inner wall 44 of the plenum 40 will attach itself to the surface of the wall 100 and continue to remain attached to the surface of the conical wall 62 as a result of the operation of the Coanda effect. This attachment does not occur in the prior engine shown in FIG. 1 because of the relatively sharper junction shown at 60.

As a consequence of this, the cooling air stream follows the wall 62 and the configuration of the facing surface 90 of the rear turbine shroud 34, including the presence of the tube 38, becomes immaterial because such surfaces or obstructions are not contacted by the flowing stream. To further assure that such contact will not be made, it is preferable that the space 88 between the edges 64 and 66 of the conical wall 62 and the rear turbine shroud, respectively, have a cross sectional area or flow area that is no greater than the flow area extending upstream therefrom to the upstream edge of the connecting wall 100. That is to say, there is no greater restriction to the flow of the cooling air found in the flow path along the connecting wall 100 and the conical wall 62 than that found at the space 88 between the edges 64 and 66.

The engine of FIG. 2 is also characterized by the complete absence of any aerodynamically uniform cover for the non-uniform structure adjacent or on the surface 90, as, for example, the tube 38.

Desirably, some means of imparting swirl to the gases flowing in the cooling air path is desired. These could be in the form of vanes 104 located just downstream of the diffuser 20 or vanes 106 similar to the vanes 86. Indeed, such means could even be the absence of any structure tending to eliminate the natural swirl of the gases as they leave the diffuser 20.

The resulting circumferential flow of gases in the cooling air path is desirable in that it generates high centrifugal forces in the flowing gas stream which of course tend to move the gas radially outward. Such a tendency enhances the Coanda effect and tends to keep the cooling air stream firmly attached to the connecting wall 100 and the conical wall 62.

From the foregoing, it will be appreciated that through the relatively simple expedient of providing a curved connecting wall between the radially inner wall 58 and the conical wall 62 of the combustor 50, the expensive cover 80 and the complexity associated therewith may be eliminated by taking advantage of the Coanda effect.

I claim:

1. In a gas turbine engine having a rotary compressor, a radial flow turbine wheel coupled to the compressor, an annular combustor having a radially inner wall and a conical wall extending axially toward said turbine wheel and radially outwardly from said inner wall and being connected thereto and terminating in an outlet, a nozzle surrounding said turbine wheel and connected to said outlet, a compressed air plenum connected to said compressor and generally surrounding said combustor and terminating in a rear turbine shroud adjacent said turbine wheel and spaced from said conical wall to define a cooling air passage between said inner wall and said conical wall on the one hand and said plenum and said rear turbine shroud on the other and opening to a location in the vicinity of the nozzle, and structure of non-uniform shape on the surface of said rear shroud remote from said turbine wheel and facing said passage, the improvement wherein said engine is characterized by: the presence of means defining an interconnecting wall of smoothly curved shape joining said inner wall and said conical wall for causing a cooling air stream in said passage to attach itself to said interconnecting and conical walls; and the absence of any aerodynamically smooth cover for said rear shroud and the structure of non-uniform shape thereon.

2. The gas turbine engine of claim 1 further characterized by means in said passage for imparting circumferential swirl to gas flowing in said passage.

3. The gas turbine engine of claim 2 wherein said rear turbine shroud and said conical wall have spaced edges adjacent said nozzle, the cross sectional area of the space between said edges being no greater than the cross sectional area of said cooling air passage along said interconnecting and conical walls.

4. The gas turbine engine of claim 1 wherein said structure of non-uniform shape comprises a hot gas starter tube.

5. A gas tubrine engine having a rotary compressor, a radial flow turbine wheel coupled to the compressor, an annular combustor having a radially inner wall and a conical wall extending axially toward said turbine wheel and radially outwardly from said inner wall and being connected thereto and terminating in an outlet, a nozzle surrounding said turbine wheel and connected to said outlet, a compressed air plenum connected to said compressor and generally surrounding said combustor and terminating in a rear turbine shroud adjacent said turbine wheel and spaced from said conical wall to define a cooling air passage between said inner wall and said conical wall on theone hand and said plenum and said rear turbine shroud on the other, said cooling air passage discharging into said nozzle through a space defined by spaced edges of said conical wall and said rear turbine shroud, and at leastone hot gas starter tube extending along part of the surface of said rear shroud remote from said turbine wheel and facing said passage, the improvement wherein said engine is characterized by: the presence of means defining an interconnecting wall of smoothly curved shape joining said inner wall and said conical wall for causing a cooling air stream in said passage to attach itself to said interconnecting and conical walls; the absence of any aeordynamically smooth cover for said rear shroud and the non-uniform structure thereon; and the cooling air passage, along said interconnecting and conical walls being dimensioned such as to create no greater restriction to flow of cooling air therethrough than exists at said space between said edges.

6. A gas turbine engine having a rotary compressor, a radial flow turbine wheel coupled to the compressor, an annular combustor having a radially inner wall and a conical wall extending axially toward said turbine wheel and radially outwardly from said inner wall and being connected thereto and terminating in an outlet, a nozzle surrounding said turbine wheel and connected to said outlet, and a compressed air plenum connected to said compressor and generally surrounding said combustor and terminating in a rear turbine shroud adjacent said turbine wheel and spaced from said conical wall to define a cooling air passage opening in the vicinity of the nozzle and located between said inner wall and conical wall on the one hand and said plenum and said rear turbine shroud on the other, the improvement wherein said engine is characterized by: the presence of means defining an annular interconnecting wall of smoothly curved shape joining said inner wall and said conical wall for causing a cooling air stream in said passage to attach itself to said interconnecting and conical walls.

7. The gas turbine engine of claim 6 wherein the surface of said rear turbine shroud is exposed to said cooling air passage and is not similar in the geometric sense to said conical wall.

* * * * *